United States Patent
Xu et al.

(10) Patent No.: US 12,202,080 B1
(45) Date of Patent: Jan. 21, 2025

(54) HIGH-STRENGTH, HIGH-TOUGHNESS, AND CORROSION-RESISTANT WELDING METHOD FOR TKY NODES IN DEEPWATER JACKET

(71) Applicant: Tianjin University, Tianjin (CN)

(72) Inventors: Lianyong Xu, Tianjin (CN); Yongdian Han, Tianjin (CN); Zhaowei Xue, Tianjin (CN); Lei Zhao, Tianjin (CN); Kangda Hao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/741,735

(22) Filed: Jun. 12, 2024

(30) Foreign Application Priority Data

Nov. 30, 2023 (CN) .......................... 202311630534.8

(51) Int. Cl.
*B23K 9/00* (2006.01)
*B23K 9/10* (2006.01)
*B23K 9/173* (2006.01)

(52) U.S. Cl.
CPC .......... *B23K 9/0026* (2013.01); *B23K 9/1093* (2013.01); *B23K 9/173* (2013.01)

(58) Field of Classification Search
CPC ............................. B23K 9/0026; B23K 9/1093
See application file for complete search history.

(56) References Cited

U.S. PATENT DOCUMENTS

2024/0020429 A1* 1/2024 Boster .................... B33Y 10/00

FOREIGN PATENT DOCUMENTS

| CN | 101733562 | | 6/2010 | | |
|---|---|---|---|---|---|
| CN | 109226941 | A * | 1/2019 | ............. | B23K 9/173 |
| CN | 111069801 | A * | 4/2020 | ............. | B23K 28/02 |
| CN | 108453340 | | 11/2020 | | |
| CN | 109128550 | | 1/2021 | | |
| CN | 112935601 | | 6/2021 | | |
| CN | 114178658 | A * | 3/2022 | | |
| CN | 116695660 | A * | 9/2023 | | |
| CN | 116765665 | | 9/2023 | | |

OTHER PUBLICATIONS

Machine translation of CN-116695660-A, Sep. 2024 (Year: 2024).*
Machine translation of CN-114178658-A, Sep. 2024 (Year: 2024).*
Machine translation of CN-111069801-A, Sep. 2024 (Year: 2024).*
Machine translation of CN-109226941-A, Sep. 2024 (Year: 2024).*

* cited by examiner

*Primary Examiner* — Geoffrey S Evans
(74) *Attorney, Agent, or Firm* — JCIPRNET

(57) ABSTRACT

A high-strength, high-toughness, and corrosion-resistant welding method for TKY nodes in a deepwater jacket includes the following steps: preheating T/K/Y nodes at a predetermined temperature according to a wall thickness of a base material; setting different welding parameters for different welding processes; and performing rooting weld on the preheated T/K/Y nodes through an electrode arc welding process, then performing filling weld through a gas metal arc welding process, and finally performing capping weld through the gas metal arc welding process. A corresponding electrode is selected for the rooting weld, a welding wire is selected for the capping weld according to low-strength matching, a welding wire is selected for the filling weld according to an equal-strength matching principle, and diffusible hydrogen contents of any electrode and any of the welding wires are all less than or equal to a predetermined diffusible hydrogen content.

7 Claims, 1 Drawing Sheet

HIGH-STRENGTH, HIGH-TOUGHNESS, AND CORROSION-RESISTANT WELDING METHOD FOR TKY NODES IN DEEPWATER JACKET

CROSS-REFERENCE TO RELATED APPLICATION

This application claims the priority benefit of China application serial no. 202311630534.8, filed on Nov. 30, 2023. The entirety of the above-mentioned patent application is hereby incorporated by reference herein and made a part of this specification.

BACKGROUND

Technical Field

The disclosure belongs to the technical field of welding, and more specifically, relates to a high-strength, high-toughness, and corrosion-resistant welding method for TKY nodes in a deepwater jacket.

Description of Related Art

In offshore petroleum engineering, the fixed jacket platform is the most commonly used structural form in the exploration of oil and gas resources in deep water fields, and the intersection nodes (TKY nodes) of large pipes form its most important welding structure. TKY nodes are the main force-bearing structures in marine engineering. Stress concentrations at main and branch pipe connections are significant due to the weights of structures and equipment themselves, as well as extreme loads such as waves and storms. Under the interaction of alternating loads and seawater corrosion, corrosion, fatigue, and fracture damage can easily occur at joints. Therefore, in order to meet the long-term use of offshore platforms, TKY nodes are required to have good low-temperature toughness, atmospheric corrosion resistance, and seawater corrosion resistance. The welding quality of high-strength steel directly determines the performance of TKY joints. If the welding process is unreasonable, cold cracks may occur or the toughness may decrease. Under the action of the welding heat cycle, the structure and properties of the base material on both sides of the weld change significantly, causing the welding heat-affected zone to soften or embrittle, and worsen the performance of the TKY welded joint. At present, research on commonly used welding methods mainly focuses on controlling the welding heat input and optimizing the welding heat cycle, so as to reduce the adverse impact on the welding heat-affected zone. Further, the weld metal, especially at the weld root, is also often the weakest region of the joint due to the filler metal composition and welding heat cycles. The dilution of the base material significantly changes its composition, which can easily cause local embrittlement of the weld metal.

In the field of marine engineering, gas shielded welding and submerged arc welding are the most widely used welding methods. For instance, Chinese patent CN108453340B discloses a steel structure TKY node welding method, which focuses on solving weld formation and defects. CN112935601 A discloses a thick plate multi-layer multi-pass welding method of low-alloy high-strength steel. The welding method of gas shielded welding for rooting weld and submerged arc welding and filling is used to make up for the problem of insufficient weld strength. CN109128550B discloses a gas-shielded welding process for bridge steel with high tensile strength. By matching two different welding wires and combining them with the $CO_2$ gas shielded welding process, it is ensured that the entire welded joint has high plastic toughness. CN116765665 A discloses a welding process of 500 MPa-strength weathering steel. By combining flux-cored wire and cold metal transition welding processes, the low-temperature impact performance of the welded joints is improved. The above technical solutions have been optimized for the welding process of high-strength steel for different purposes, and the performance of the weld is improved to a certain extent. However, the above method is difficult to be used to optimize the welding process of steel for offshore platform structures. The failure of high-strength steel welded joints caused by improper welding process and substandard weld performance may seriously affect the safety of deepwater platforms.

Therefore, in view of the complex marine environment, there is an urgent need for a comprehensive performance welding process that can make the overall tensile strength of the weld meet the standard, ensure that the root and cap of the weld have high toughness and high corrosion resistance, and make TKY node welded thick-walled structures resistant to instability and fracture and high corrosion resistance.

SUMMARY

In view of the defects found in the related art, the disclosure aims to provide a high-strength, high-toughness, and corrosion-resistant welding method for TKY nodes in a deepwater jacket, so as to solve the problems of low toughness, poor corrosion resistance, and easy generation of cold cracks in welded joints caused by an existing welding process of TKY nodes in a deepwater platform jacket.

To achieve the above, the disclosure provides a high-strength, high-toughness, and corrosion-resistant welding method for TKY nodes in a deepwater jacket, and the method includes the following steps.

In S1, T/K/Y nodes are preheated at a predetermined temperature according to a wall thickness of a base material.

In S2, different welding parameters are set for different welding processes.

In S3, rooting weld is performed on the preheated T/K/Y nodes through an electrode arc welding process and an electrode, filling weld is then performed through a gas metal arc welding process and a welding wire, and capping weld is finally performed through the gas metal arc welding process. Herein, an electrode is selected for the rooting weld according to a low-strength matching principle, a first welding wire is selected for the capping weld according to the low-strength matching principle, a second welding wire is selected for the filling weld according to an equal-strength matching principle, and diffusible hydrogen contents of the electrode, the first welding wire, and the second welding wire are all less than or equal to a predetermined diffusible hydrogen content.

Further, when a wall thickness W of the base material satisfies: 38 mm<W≤50 mm, the preheating temperature ranges from 65° C. to 150° C.

Further when a wall thickness W of the base material satisfies: 50 mm<W≤80 mm, the preheating temperature ranges from 110° C. to 150° C.

Further, the predetermined diffusible hydrogen content is 5.0 ml/100 g, and preferably, the diffusible hydrogen contents of the electrode and at least one of the first welding wire and the second welding wire are the same or different.

Further, at least one of a diameter of the first welding wire and a diameter of the second welding wire is 1 mm or 1.2 mm.

Further, at least one of an extension length of the first welding wire and an extension length the second welding wire is 10 to 12 times their diameters.

Further, at least one of yield strength, tensile strength, and impact toughness of the first welding wire and the second welding wire are the same or different.

Further, in step S3, when at least one of the filling weld and the capping weld is performed, a selected protective gas consists of 82% Ar and 18% $CO_2$, and preferably, a protective gas flow rate during welding is 20 L/min to 25 L/min.

Further, the welding parameters corresponding to different welding processes make a distance between adjacent welding layers within 3 mm to 5 mm, and a temperature between adjacent welding layers does not exceed 250° C.

Further, when the rooting weld is performed through the electrode arc welding process, the corresponding welding parameters are: a welding current is between 90 A and 120 A, an arc voltage is between 20V and 23V, and a welding speed is between 65 mm/min and 90 mm/min.

Further, when the filling weld and the capping weld are performed through the gas metal arc welding process, a welding voltage of the filling weld is 18V to 24V, the welding current is between 160 A and 190 A, the welding speed is between 300 mm/min and 500 mm/min, and a wire feeding speed is between 6 m/min and 9 m/min.

Further, when the capping weld is performed through the gas metal arc welding process, the corresponding welding parameters are: the welding voltage is between 22V and 24V, the welding current is between 175 A and 190 A, the welding speed is between 300 mm/min and 500 mm/min, and the wire feeding speed is between 8 m/min and 9 m/min.

Further, when at least one of the filling weld and the capping weld is performed, welding equipment swings at a swing frequency of 2.5 Hz to 4 Hz and a swing amplitude of 1 mm to 2 mm.

The above technical solutions provided by the disclosure have the following advantages compared to the related art.

In the disclosure, the TKY nodes to be welded are preheated at high temperature, SMAW (electrode arc welding) is used for rooting weld, and GMAW (gas metal arc welding) is used for filling weld and capping weld. The electrode is selected for the rooting weld according to the low-strength matching principle, the corresponding first welding wire is selected for the capping weld according to the low-strength matching principle, and the second welding wire is adopted for the filling weld according to the equal-strength matching principle. Further, the diffusible hydrogen contents of the corresponding welding wire and electrode selected for each welding are less than or equal to the predetermined diffusible hydrogen content. In this way, the overall toughness of a welded seam is improved through different alloying strategies and the generation of cold cracks is also prevented.

In the disclosure, by combining the low heat input parameter combinations corresponding to the different welding processes for welding, the width of a heat-affected zone of the welded seam is further reduced, which also helps reduce the dilution of the welded seam by the base metal. The weld metal is prevented from producing some hard and brittle phases under the action of thermal cycles and the occurrence of local embrittlement is reduced.

In the disclosure, under the premise of adopting a combination of high preheating and low welding heat input, low-hydrogen, high-toughness, and high-corrosion-resistant electrode or welding wires with different properties such as yield strength, tensile strength, and impact toughness are used in performing rooting weld/capping weld and filling weld on the welds. That is, different alloying strategies are adopted to complete high-performance welding of deepwater TKY jacket nodes. The generation of cold cracks is prevented and reduced, the overall toughness of the welded seam is improved, and the overall strength of the welded seam reaches the standard. The root and cap of the welded seam have low strength, high toughness, and high corrosion resistance. Combining the two methods, the high-strength steel thick-walled structure of the deepwater platform has high comprehensive performance in resisting instability, fracture, and corrosion.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

Figure 1:
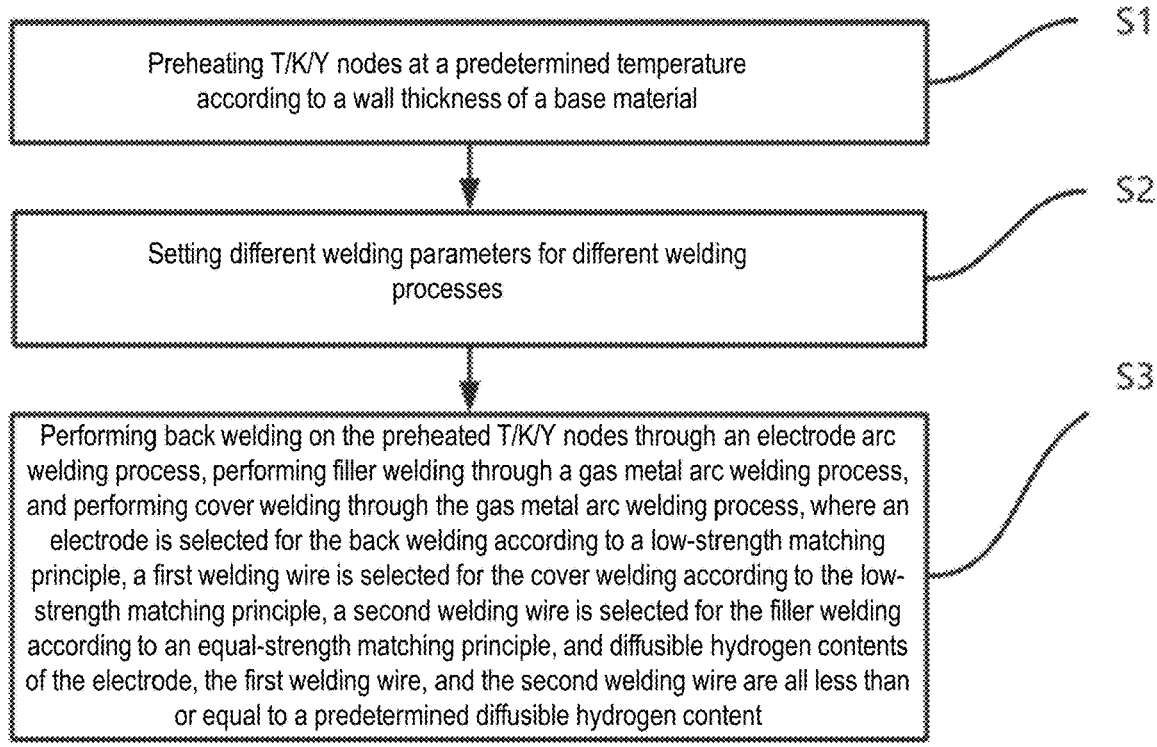
FIG. 1 is a schematic flow chart of a high-strength, high-toughness, and corrosion-resistant welding method for TKY nodes in a deepwater jacket provided by an embodiment of the disclosure.

In the figures: 1: rooting weld, 2: first filling weld, 3: second filling weld, 4: third filling weld, 5: third filling weld, 6: fourth filling weld, 7: first capping weld, and 8: second capping weld.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure.

The disclosure provides a high-strength, high-toughness, and corrosion-resistant welding method for TKY nodes in a deepwater jacket, and the method includes the following steps.

In S1, T/K/Y nodes are preheated at a specific temperature according to a predetermined temperature according to a wall thickness of a base material.

In S2, different welding parameters are set for different welding processes.

In S3, rooting weld is performed on the preheated T/K/Y nodes through an electrode arc welding process and an electrode, filling weld is then performed through a gas metal arc welding process and a welding wire, capping weld is finally performed through the gas metal arc welding process, and different alloyed welding wires are selected. Herein, a high-toughness and high-corrosion-resistant electrode is selected for the rooting weld according to a "low-strength matching principle", a high-toughness and high-corrosion-resistant first welding wire is selected for the capping weld according to the "low-strength matching principle", a second welding wire with a strength close to that of the base metal is selected for the filling weld according to an "equal-strength matching principle", so it is ensured that overall strength of a welded seam reaches a standard, and diffusible hydrogen contents of the electrode, the first welding wire, and the second welding wire are all less than or equal to a predetermined diffusible hydrogen content.

In this embodiment, the wall thickness of a general medium-thick wall base material is between 38 mm and 80 mm. When a wall thickness W of the base material satisfies: 38 mm<W≤50 mm, the preheating temperature ranges from 65° C. to 150° C. If W is 45 mm, a minimum preheating temperature is not lower than 80° C., and if W is 50 mm, the minimum preheating temperature is 100° C.

In this embodiment, when the wall thickness W of the base material satisfies 50 mm<W≤80 mm, the preheating temperature ranges from 110° C. to 150° C. If W is 65 mm, the minimum preheating temperature is not lower than 115° C., and if W is 80 mm, the minimum preheating temperature is 140° C.

In this embodiment, the diffusible hydrogen contents of the aforementioned electrode, the first welding wire, and the second welding wire are all less than or equal to 5.0 ml/100 g, such as 5.0 ml/100 g, 4.0 ml/100 g, 3.0 ml/100 g, 2.0 ml/100 g, etc. To be specific, the diffusible hydrogen contents of the electrode and at least one of the first welding wire and the second welding wire are the same or different.

In this embodiment, at least one of a diameter of the first welding wire and a diameter of the second welding wire is 1 mm or 1.2 mm. For instance, the diameter of the first welding wire is selected as 1.2 mm, and the diameter of the second welding wire is selected as 1 mm.

In this embodiment, at least one of an extension length of the first welding wire and an extension length the second welding wire is 10 to 12 times the diameters of the respective welding wires. If the diameter of the corresponding welding wire is 1 mm, its extension length is 11 mm or 12 mm, and if the diameter of the corresponding welding wire is 1.2 mm, its extension length is 12 mm or 14.4 mm. If extension is excessively long, it will lead to a drop in arc voltage, excessive deposited metal, poor welded seam formation, reduced penetration, an unstable arc, and large splashing. If extension is excessively short, the arc may easily burn a contact tip, and metal splash may easily block a nozzle.

In this embodiment, at least one of yield strength, tensile strength, and impact toughness of the first welding wire and the second welding wire are the same or different. For example, the yield strength, tensile strength, and impact toughness of the first welding wire and the second welding wire are different. For another example, the yield strength, tensile strength, and impact toughness of the first welding wire and the second welding wire are the same. For still another example, the yield strength and tensile strength of the first welding wire and the second welding wire are different, but the impact toughness is the same.

In this embodiment, the yield strength, tensile strength, and impact toughness of any electrode selected above are different from the yield strength, tensile strength, and impact toughness of any of the welding wires (first welding wire and the second welding wire) selected.

In this embodiment, in step S3, when at least one of the filling weld and the capping weld is performed, a selected protective gas consists of 82% Ar and 18% $CO_2$. To be specific, a protective gas flow rate during welding is between 20 L/min and 25 L/min. For example, the gas flow rate may be 20 L/min, 21 L/min, 22 L/min, 23 L/min, 24 L/min, 25 L/min to ensure a stable welding environment and high welding quality.

In this embodiment, the welding parameters corresponding to different welding processes can ensure that a layer spacing is within 3 mm to 5 mm and an interlayer temperature (i.e., an interpass temperature) does not exceed 250° C., thereby ensuring that the welding quality of each welding is qualified.

In this embodiment, when the rooting weld is performed through the electrode arc welding process, the corresponding welding parameters are: a welding current is between 90 A and 120 A (e.g., 90 A, 100 A, 110 A, 120 A, etc.), an arc voltage is between 20V and 23V (e.g., 20V, 21V, 22V, 23V, etc.), and a welding speed is between 65 mm/min and 90 mm/min (e.g., 65 mm/min, 70 mm/min, 75 mm/min, 80 mm/min, 85 mm/min, 90 mm/min, etc.).

In this embodiment, when the filling weld and the capping weld are performed through the gas metal arc welding process, a welding voltage of the filling weld is between 18V and 24V (e.g., 18V, 20V, 22V, 23V, 24V, etc.), the welding current is between 160 A and 190 A (e.g., 160 A, 170 A, 180 A, 190 A, etc.), the welding speed is between 300 mm/min and 500 mm/min (e.g., 300 mm/min, 350 mm/min, 400 mm/min, 450 mm/min, 500 mm/min, etc.), and a wire feeding speed is between 6 m/min and 9 m/min (6 m/min, 7 m/min, 8 m/min, 9 m/min, etc.).

In this embodiment, when the capping weld is performed through the gas metal arc welding process, the corresponding welding parameters are: the welding voltage is between 22V and 24V (e.g., 22V, 23V, 24V, etc.), the welding current is between 175 A and 190 A (e.g., 175 A, 180 A, 185 A, 190 A, etc.), the welding speed is between 300 mm/min and 500 mm/min (300 mm/min, 350 mm/min, 400 mm/min, 450 mm/min, 500 mm/min, etc.), and the wire feeding speed is between 8 m/min and 9 m/min (e.g., 8 m/min, 8.5 m/min, 9 m/min, etc.).

Combining the low heat input parameter combinations corresponding to the different welding processes mentioned above for welding, a width of a heat-affected zone of the welded seam may be reduced, which also helps reduce the dilution of the welded seam by the base metal, and the welding strength may be prevented from being lowered.

In this embodiment, when at least one of the filling weld and the capping weld is performed, welding equipment swings at a swing frequency of 2.5 Hz to 4 Hz and a swing amplitude of 1 mm to 2 mm. For instance, the swing frequency may be 2.5 Hz, 3 Hz, 3.5 Hz, 4 Hz, etc., and the swing amplitude may be 1 mm, 1.5 mm, 2 mm, etc.

In order to better illustrate the implementation details of the disclosure, the following examples are provided to further illustrate the disclosure. It should be clear that the following examples are only regarded as the best implementations and are not intended to limit the scope of the disclosure.

Example 1

Taking steel D36 for TKY nodes where tubes intersect as an example, the material has a yield strength of 355 MPa and a tensile strength of 490 MPa to 630 MPa. The specific welding steps are as follows.

Figure 2:
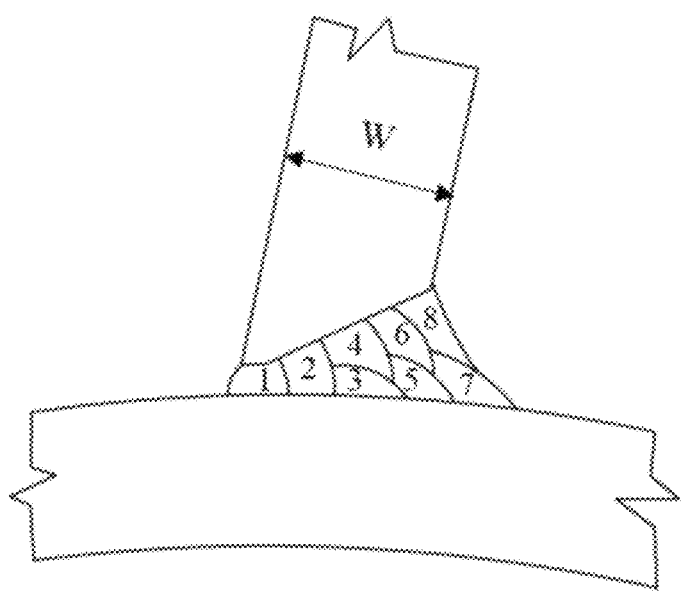
FIG. 2 is a schematic structural diagram of a TKY node welding joint in the deepwater jacket provided by an embodiment of the disclosure.

In step 1, according to the wall thickness and diameter of the D36 base metal, the groove processing and assembly are performed strictly in accordance with the node groove form, the blunt edge, the assembly gap, and other parameters specified in the American Welding Society specification AWSD1.1, and a groove and weld bead planning shown in FIG. 2 is used as a welding path.

In step 2, welding equipment, including a welding gun, a welding power source, a cooling water tank, a gas cylinder, etc., are set up.

In step 3, the TKY node structure is preheated. When the wall thickness is 38 mm<W≤50 mm, the minimum preheating temperature is 65° C., and when the wall thickness is 50 mm<W≤80 mm, the minimum preheating temperature is 110° C.

In step 4, different welding parameters are set according to the specific groove size, the welding wire is matched for welding.

For performing rooting weld on a weld 1 using SMAW, the welding parameters are set as follows: the welding current is 90 A to 120 A, the arc voltage is 20V to 23 V, the welding speed is 65 mm/min to 90 mm/min, and the matching electrode has a yield strength of 390 MPa, a tensile strength of 470 MPa, and an impact toughness of 100 J (−50° C.).

For filling a first weld 2 to a sixth weld 6 using GMAW, the welding parameters are set as follows: When filling is performed on the welds 2 to 4, the welding voltage is set to 18V to 20V, the welding current is 160 A to 170 A, the wire feeding speed ranges from 6 m/min to 7 m/min, and the welding speed is 300 mm/min to 500 mm/min. When filling is performed on the welds 5 to 6, the welding voltage is set to 20V to 24V, the welding current is 170 A to 180 A, the wire feeding speed ranges from 7 m/min to 9 m/min, and the welding speed is 300 mm/min to 500 mm/min. When welding is performed on the welds 2 to 6, the swing frequency of the welding gun is 2.5 HZ to 4 HZ, the swing amplitude is 1 mm, and the matching second welding wire has a yield strength of 495 MPa, a tensile strength of 575 MPa, and an impact toughness of 105 J (−20° C.).

For capping welds 7 to 8 using GMAW, the welding voltage is set to 22V to 24V, the welding current is 175 A to 190 A, the wire feeding speed ranges from 8 m/min to 9 m/min, the welding speed is 300 mm/min to 500 mm/min. The swing frequency is 2.5 HZ to 4 HZ, the swing amplitude is 2 mm, and the matching first welding wire has a yield strength of 390 MPa, a tensile strength of 470 MPa, and an impact toughness of 100 J (−50° C.).

In the aforementioned step 4, the diffusible hydrogen contents of the electrode, the first welding wire, and second welding wire cladding metal selected for welding of each weld is less than or equal to 5.0 ml/100 g. The yield strength, tensile strength, and impact toughness of the first welding wire and the second welding wire are all different. Further, the diameters of the first welding wire and the second welding wire are both selected to be 1.0 mm or 1.2 mm, and the extension lengths are 10 to 12 times the diameters of the first welding wire and the second welding wire. The protective gas is 82% Ar and 18% $CO_2$, and the gas flow rate is 20 L/min to 25 L/min.

The specific welding parameters for each of the aforementioned welded seams shall be selected so that the layer spacing is controlled between 3 mm and 5 mm, and the interlayer temperature shall not exceed 250° C. After each layer is welded, slag cleaning is required to be carried out in a timely manner.

Example 2

In this embodiment, the base material is the same as that in Example 1, the material yield strength is 355 MPa, and the tensile strength is 490 MPa to 630 MPa. The welding steps and corresponding welding parameters are also basically the same, except that the selected welding wires are different.

For performing rooting weld on the weld 1 using SMAW, the matching electrode has a yield strength of 390 MPa, a tensile strength of 470 MPa, an impact toughness of 100 J (−50° C.), a diameter of 1.0 mm, an extension length of 11 mm, and the diffusible hydrogen content of the electrode of 4.0 ml/100 g.

For filling the first weld 2 to the sixth weld 6 using GMAW, the second welding wire matched according to the equal-strength matching principle has a yield strength of 495 MPa, a tensile strength of 575 MPa, an impact toughness of 105 J (−20° C.), a diameter of 1.2 mm, and an extension length of 12 mm, and the diffusible hydrogen content of the second welding wire cladding metal is 5.0 ml/100 g.

For the capping welds 7 to 8 using GMAW, the first welding wire selected according to the low-strength matching principle has a yield strength of 390 MPa, a tensile strength of 470 MPa, an impact toughness of 100 J (−50° C.), a diameter of 1 mm, and an extension length of 11 mm, and the diffusible hydrogen content of the welding wire cladding metal is 4.0 ml/100 g.

In any of the embodiments, under the premise of using a combination of low hydrogen welding wires, high preheating, and low welding heat input and together with different alloying strategies for performing the rooting weld/capping weld and the filling weld on the welds, high-performance welding of deepwater TKY jacket nodes is completed. The generation of cold cracks is prevented and reduced, so the overall toughness of the welded seam is improved. By adopting different alloying strategies for performing the rooting weld/capping weld and the filling weld on the welds, the overall strength of the welded seam reaches the standard, and the root and cap have low strength, high toughness, and high corrosion resistance. Combining the two methods, the high-strength steel thick-walled structure of the deepwater platform has high comprehensive performance in resisting instability, fracture, and corrosion.

In the disclosure, the terms "first" and "second" are only used for descriptive purposes and cannot be understood as indicating or implying relative importance or implicitly indicating the number of indicated technical features. Thus, the features defined with "first" and "second" may explicitly or implicitly include one or more of these features. In the description of the disclosure, "plurality" means two or more than two, unless otherwise expressly and specifically defined.

The above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A high-strength, high-toughness, and corrosion-resistant welding method for TKY nodes in a deepwater jacket, comprising:

step 1: preheating T/K/Y nodes at a preheating temperature according to a wall thickness of a base material, wherein, the wall thickness of the base material is greater than 38 mm;

step 2: setting different welding parameters for different welding processes: when the wall thickness W of the base material satisfies 38 mm<W≤50 mm, the preheating temperature ranges from 65° C. to 150° C.; when the wall thickness W of the base material satisfies 50 mm<W≤80 mm, the preheating temperature ranges from 110° C. to 150° C.;

step 3: performing rooting weld on the preheated T/K/Y nodes through an electrode arc welding process; then performing filling weld through a gas metal arc welding process; and finally performing capping weld through the gas metal arc welding process; wherein: an electrode is selected for the rooting weld according to a low-strength matching principle, a welding current is between 90 A and 120 A, an arc voltage is between 20V and 23V, and a welding speed is between 65 mm/min and 90 mm/min; a first welding wire is selected for the capping weld according to the low-strength matching principle, the welding current is between 175 A and 190 A, the welding voltage is between 22V and 24V, the welding speed is between 300 mm/min and 500 mm/min, and a wire feeding speed is between 8 m/min and 9 m/min; a second welding wire is selected for the filling weld according to an equal-strength matching principle, the welding current is between 160 A and 190 A, the welding voltage is between 18V and 24V, the welding speed is between 300 mm/min and 500 mm/min, and the wire feeding speed is between 6 m/min and 9 m/min;

in step 3, diffusible hydrogen contents of the electrode, the first welding wire, and the second welding wire are all less than or equal to a predetermined diffusible hydrogen content; when the filling weld and/or the capping weld is performed, a selected protective gas consists of 82% Ar and 18% $CO_2$, and a protective gas flow rate during welding is between 20 L/min to 25 L/min.

2. The high-strength, high-toughness, and corrosion-resistant welding method for the TKY nodes in the deepwater jacket according to claim 1, wherein the predetermined diffusible hydrogen content is 5.0 ml/100 g.

3. The high-strength, high-toughness, and corrosion-resistant welding method for the TKY nodes in the deepwater jacket according to claim 2, wherein the diffusible hydrogen contents of the electrode, the first welding wire and/or the second welding wire are the same.

4. The high-strength, high-toughness, and corrosion-resistant welding method for the TKY nodes in the deepwater jacket according to claim 2, wherein the diffusible hydrogen contents of the electrode, the first welding wire and/or the second welding wire are different.

5. The high-strength, high-toughness, and corrosion-resistant welding method for the TKY nodes in the deepwater jacket according to claim 1, wherein a diameter of the first welding wire and/or a diameter of the second welding wire is 1 mm or 1.2 mm.

6. The high-strength, high-toughness, and corrosion-resistant welding method for the TKY nodes in the deepwater jacket according to claim 1, wherein yield strength, tensile strength, and/or impact toughness of the first welding wire and the second welding wire are the same.

7. The high-strength, high-toughness, and corrosion-resistant welding method for the TKY nodes in the deepwater jacket according to claim 1, wherein yield strength, tensile strength, and/or impact toughness of the first welding wire and the second welding wire are different.

\* \* \* \* \*